United States Patent [19]
Yokokawa et al.

[11] Patent Number: 5,252,411
[45] Date of Patent: Oct. 12, 1993

[54] PROTECTIVE APPARATUS FOR SECONDARY BATTERY

[75] Inventors: Masaaki Yokokawa; Takayuki Aita, both of Fukushima, Japan

[73] Assignee: Sony Corporation, Tokyo, Japan

[21] Appl. No.: 765,259

[22] Filed: Sep. 25, 1991

[30] Foreign Application Priority Data

Sep. 26, 1990 [JP] Japan .................................. 2-256487

[51] Int. Cl.⁵ .......................................... H01M 10/48
[52] U.S. Cl. ........................................ 429/62; 320/36
[58] Field of Search ...................... 429/7,62; 320/36

[56] References Cited

U.S. PATENT DOCUMENTS

| | | | |
|---|---|---|---|
| 2,573,483 | 10/1951 | Peters | 429/62 X |
| 4,727,006 | 2/1988 | Malinowski et al. | 429/62 X |

FOREIGN PATENT DOCUMENTS

| | | | |
|---|---|---|---|
| 2091914 | 1/1972 | France. | |
| 59-134557 | 8/1984 | Japan | 429/7 |
| 866614 | 9/1981 | U.S.S.R. | 429/7 |
| 2088158 | 6/1982 | United Kingdom. | |

*Primary Examiner*—Stephen Kalafut

[57] ABSTRACT

Disclosed is a protective apparatus for a secondary battery comprising a temperature sensing switch turned on when the ambient temperature around the secondary battery exceeds a predetermined temperature setting, and a discharging circuit electrically connected via the temperature sensing switch to the secondary battery, the discharging circuit acting to discharge that battery. The discharging circuit contains a voltage sensing switch turned on when the voltage applied to the discharging circuit exceeds a predetermined discharge starting voltage, and a discharging resistor serially connected to the voltage sensing switch.

6 Claims, 1 Drawing Sheet

PROTECTIVE APPARATUS FOR SECONDARY BATTERY

BACKGROUND OF THE INVENTION

The present invention relates to a protective apparatus for secondary batteries.

Secondary batteries have been used as a power source of such electronic devices as video cameras and headphone stereo equipment. As these electronic devices are gaining more in capability while being made smaller in size, there is a growing demand that their secondary batteries provide higher energy density.

This requirement is being met by the ongoing development of nonaqueous electrolyte secondary batteries. These are batteries that use as their anode the lithium metal, lithium alloy, or a carbonaceous material that allows lithium to be doped and dedoped.

One disadvantage of the nonaqueous electrolyte secondary batteries is that when they are left in an atmosphere whose temperature is higher than room temperature, the batteries tend to lose their capacity because of degradation in the electrolyte and/or in the active material thereof. Thereafter, the batteries fail to recover their initial capacity following a sufficiently long recharging process.

OBJECT AND SUMMARY OF THE INVENTION

It is therefore an object of the present invention to provide a protective apparatus for secondary batteries, the apparatus automatically preventing the decrease of the capacity in the batteries when they are left in a high temperature atmosphere.

In carrying out the invention, there is provided a protective apparatus for a secondary battery, the apparatus comprising a temperature sensing means, which will allow current flow or be switched on substantially when the ambient temperature around the secondary battery exceeds a preselected or a predetermined temperature setting; and a discharging circuit for discharging the secondary battery being electrically connected via the temperature sensing means to the secondary battery; the discharging circuit further comprising a voltage sensing switching means for being switched on substantially when the voltage applied to the discharging circuit exceeds a predetermined discharge starting voltage; and a discharging resistor serially connected to the voltage sensing switching means, the discharging resistor setting the discharge current in effect at the time of discharging.

In operation, the apparatus according to the invention has the temperature sensing means or switching means switched on when the ambient temperature around the secondary battery exceeds the predetermined temperature setting. This connects the secondary battery electrically to the discharging circuit. When the voltage of the secondary voltage exceeds the discharge starting voltage set for the discharging circuit, the voltage sensing switching means is switched on, causing a current to be discharged from the secondary battery to the discharging resistor. The voltage of the secondary battery gradually drops through the discharging.

When the voltage of the secondary battery drops to the discharge starting voltage, the voltage sensing switching means stops the discharging of the secondary battery. In this manner, the discharging circuit is automatically switched on and off with reference to the discharge starting voltage. That is, the discharging circuit is turned on when the voltage of the secondary battery is higher than the discharge starting voltage; the discharging circuit is turned off when the voltage of the secondary battery is lower than the discharge starting voltage.

Working in the manner outlined, the apparatus allows the voltage of the secondary battery in a high temperature atmosphere to drop down to a predetermined voltage setting (discharge starting voltage). This action prevents the lowering of the capacity of the secondary battery exposed to the high temperature atmosphere. Furthermore, the apparatus prevents unnecessary discharging of the secondary battery.

DESCRIPTION OF THE PREFERRED EMBODIMENTS

Studies on the phenomenon of capacity decrease in nonaqueous electrolyte secondary batteries led the inventors to two major findings. One is that the drop of capacity in the secondary battery in a high temperature atmosphere is largely determined by the battery voltage at that time. The other finding is that when the battery voltage is held low, the recovery rate of capacity after exposure to the high temperature atmosphere is enhanced. It is on the basis of these findings that the invention has been devised and proposed.

Figure 1:
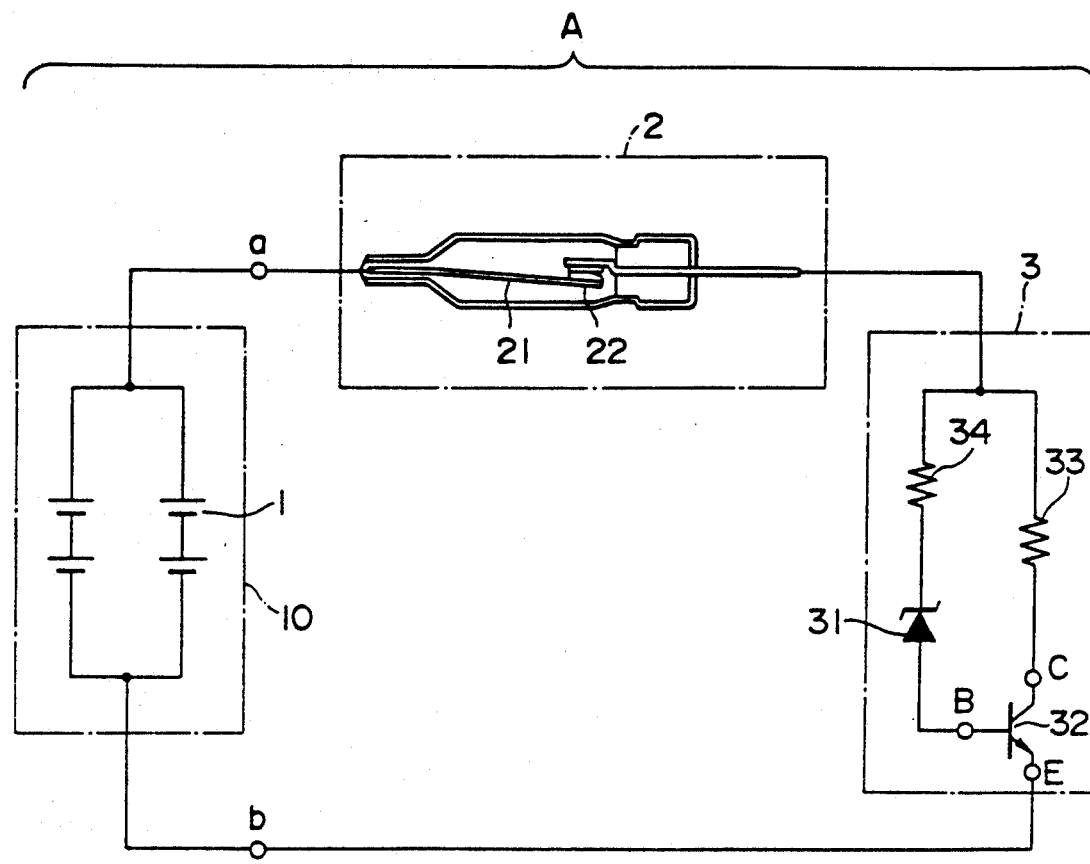
FIG. 1 is an electrical circuit diagram of a protective apparatus for secondary batteries, the apparatus being practiced as a first embodiment of the present invention.

Described below with reference to FIG. 1 is a protective apparatus for secondary batteries, practiced as the first embodiment of the invention.

As shown in FIG. 1, the protective apparatus is contained in a battery pack A that comprises an assembly 10 of secondary batteries 1. The apparatus has a bimetal type switch 2 (temperature sensing switching means) and a discharging circuit 3. The bimetal type switch 2 is switched on when the ambient temperature near the secondary batteries 1 reaches a preselected elevated or predetermined temperature setting. With the bimetal type switch activated, the discharging circuit 3 is electrically connected to the battery assembly 10.

More specifically, the secondary batteries 1 are nonaqueous electrolyte secondary batteries that have their anode active material made of a carbonaceous material, have their cathode active material made of $LiCoO_2$, and have their electrolyte solution made of a nonaqueous electrolyte solution obtained by dissolving phosphorous lithium fluoride ($LiPF_6$) at 1 mol/l into a solution which mixes propylene carbonate with 1, 2-dimethoxyethane. Each secondary battery 1 is a cylinder 20 mm in diatmeter and 42 mm in height. The battery is charged illustratively with a constant current of 250 mA at voltages of up to 4.1 V.

Two such secondary batteries are serially connected to form a serial pair. Two such serial pairs are parallelly connected to form a parallel pair (which comprises 4 secondary batteries). Ten such parallel pairs are used to constitute the second battery assembly 10. The assembly 10 is connected serially with the bimetal type switch 2 and the discharging circuit 3. These components are housed in a synthetic resin case which provides the outer shell of the battery pack A. The terminal voltage across terminals "a" to "b" of the battery assembly 10 is 8.2 V.

As ilustrated in FIG. 1, the bimetal type switch 2 combines a bimetal part 21 with switch contacts 22. When the temperature inside the battery pack A exceeds a setting of, say, 65° C. which is above normal room temperature, the bimetal part 21 warps, closing the contacts 22. This connects the battery assembly 10 electrically to the discharging circuit 3. The reference temperature setting may be changed as needed.

The discharging circuit 3 comprises an NPN switching transistor (voltage sensing switching means) 32, a discharging resistor 33 whose one end is connected to the collector C of the transistor 32, a voltage regulation diode 31 whose anode is connected to the base B of the transistor 32, and a current limiting resistor 34 whose one end is connected to the cathode of the voltage regulation diode 31.

The other end of the discharging resistor 33 and that of the current limiting resistor 34 are connected to each other as well as to the terminal "a" of the battery assembly 10 via the bimetal type switch 2. On the other hand, the emitter E of the switching transistor 32 is connected to the terminal "b" of the battery assembly 10.

The voltage regulation diode 31, which determines the discharge starting voltage, instantaneously releases its current at a voltage higher than the Zener voltage Vz. The diode 31 thus determines substantially the discharge starting voltage for the batteries at high temperature. As will be described later, the actual discharge starting voltage is determined in conjunction with the switching transistor 32. Although the discharge starting voltage is set to 7.0 V for the first embodiment, the voltage may be changed as needed.

As depicted in FIG. 1, the switching transistor 32 is switched on when the terminal voltage of the battery assembly 10 exceeds the discharge starting voltage of 7.0 V. This causes the battery assembly 10 to discharge.

The discharging resistor 33 is used to set the discharge current that flows when the switching transistor 32 is activated. The resistance value of the discharging resistor 33 is set illustratively for 15 Ω.

The current limiting resistor 34 prevents excess currents from flowing into the voltage regulation diode 31. The resistance value of the current limiting resistor 34 is set illustratively for 150 Ω.

The first embodiment of the above-described construction operates as follows:

When the ambient temperature around the secondary batteries 1 (inside the battery pack A) exceeds 65° C., the bimetal type switch 2 is switched on to close the contacts 22. This connects the battery assembly 10 electrically to the discharging circuit 3.

If the discharge starting voltage is exceeded by the terminal voltage V across the terminals "a" to "b" of the battery assembly 10 containing the secondary batteries 1, the voltage regulation diode 31 and switching transistor 32 function as follows: Here, the terminal voltage, 8.2 V, across the terminals "a" to "b" of the battery assembly 10 is higher than the sum of the Zener voltage Vz of the voltage regulation diode 31 and the voltage Vbe across the base B to the emitter E of the switching transistor 32 (i.e., Vz+Vbe; discharge starting voltage is 7 V). Because of that, currents flow into the voltage regulation diode 31 and across the base B to the emitter E of the switching transistor 32. Thus the switching transistor 32 is switched on. At this point, the discharging resistor 33 becomes a load to the battery assembly 10. Since the terminal voltage is 8.2 V, the discharging resistor 33 is supplied with 7.5 V, a voltage obtained by subtracting from the terminal voltage a saturation voltage Vce(sat) of 0.7 V across the collector C to the emitter E of the switching transistor 32. With the discharging resistor 33 set for 15 Ω, a discharge current of about 500 mA flows through the discharging resistor 33 and across the collector C to the emitter E of the switching transistor 32.

If the terminal voltage V of the battery assembly 10 is 7.0 V or lower, no current flows to the voltage regulation diode 31. The switching transistor 32 is then switched off, thereby stopping the discharging of the battery pack A automatically. In this manner, after the voltage drop down to 7.0 V, the terminal voltage of 7.0 V is maintained. That is, unnecessary discharging of the secondary batteries 1 is prevented.

During an experiment, the inventors held the ambient temperature within the battery pack A at 65° C. and let the batteries discharge. About two hours later, the voltage V across the terminals "a" to "b" of the battery assembly 10 dropped from 8.2 V to 7.0 V (3.5 V for every secondary battery 1).

The effects of the first embodiment were ascertained by comparison with a variation thereof. This variation was a battery pack B structurally identical to the battery pack A except for the omission of the bimetal type switch 2 and discharging circuit 3. The battery packs A and B were tested for performance as follows:

Placed in an atmosphere at 23° C., the battery packs A and B were discharged at a constant current of 800 mA. The discharge stop voltage was set to 5.5 V. In this setup, the battery packs A and B were tested for their discharging capacity. Then with the upper voltage limit set to 8.2 V, the battery packs A and B were charged with a constant current of 1600 mA.

After being charged, the battery packs A and B were placed in a thermostatic oven whose temperature was raised from the atmospheric temperature of 23° C. at a rate of 1° C. per minute. When a temperature of 80° C. was reached, the battery packs A and B were left at that temperature for six hours. Thereafter, the battery packs A and B were taken out of the oven and placed in the atmosphere of 23° C.

The charging and discharging cycle described above was repeated three times. After that, the battery packs A and B were measured for their discharging capacity.

Table 1 below shows how the battery capacities of the battery packs A and B changed through the above testing. The listed readings were taken before and after the sustained storage of the batteries at the high temperature.

TABLE 1

| Battery pack | Battery capacity before storage at high temperature | Battery capacity after storage at high temperature | Recovery rate of capacity |
|---|---|---|---|
| A | 1580 mAh | 1564 mAh | 99% |
| B | 1586 mAh | 1443 mAh | 91% |

From the results above, it can be seen that while the battery pack A of the first embodiment virtually remained the same in capacity before and after its storage at the high temperature, the battery pack B by comparison recovered only 91% of its capacity after exposure thereto. Thus effectiveness is ascertained of the discharge processing performed as per the invention on the nonaqueous electrolyte secondary batteries in the high temperature atmosphere.

Figure 2:
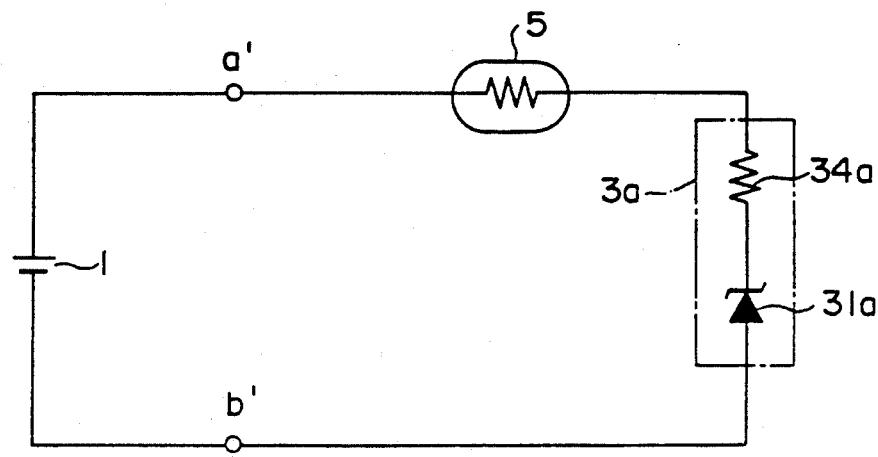
FIG. 2 is an electrical circuit diagram of another protective apparatus for secondary batteries, the apparatus being practiced as a second embodiment of the invention.

What follows is a description, with reference to FIG. 2, of a protective apparatus for secondary batteries, practiced as the second embodiment of the invention.

As shown in FIG. 2, the second embodiment is used where the secondary batteries to be protected have relatively low voltages. The second embodiment comprises a thermistor 5 (temperature sensing means) and a discharging circuit 3a that contains a resistor 34a and a voltage regulation diode 31a (voltage sensing switching means). These parts are serially connected, and their ends are connected to terminals a' and b' of a secondary battery 1.

The thermistor 5 lowers its electrical resistance as the ambient temperature rises. Located close to the secondary battery 1, the thermistor 5 electrically connects the battery to the discharging circuit 3a.

The voltage regulation diode 31a functions as the voltage sensing switching means for the discharging circuit 3a. When the terminal voltage of the secondary voltage 1 is higher than the discharge starting voltage, the voltage regulation diode 31a allows a discharge current to flow from the secondary battery 1. Thus the resistor 34a acts both as a current limiting resistor for the voltage regulation diode 31a, and as a discharging resistor when the discharge current flows.

In the second embodiment, when the thermistor 5 reaches a predetermined temperature setting, the electrical resistance between discharging circuit 3a and secondary battery 1 drops. If the terminal voltage of the secondary battery 1 is higher than the discharge starting voltage set by the voltage regulation diode 31a, the discharge current flows through the resistor 34a and the voltage regulation diode 31a from the secondary battery 1. If the terminal voltage of the secondary battery 1 becomes lower than the discharge starting voltage established, the discharge current stops flowing. In this manner, the second embodiment is simpler in structure than the first yet provides comparable effects.

With the second embodiment, if the discharge current is relatively small, the resistor 34a may be omitted, and the thermistor 5 may be made to function both as a current limiting resistor and as a discharging resistor.

While the invention has been described in conjunction with the specific embodiments, may alternatives, modifications and variations will become apparent to those skilled in the art in light of the foregoing description.

For example, the lower limit of the discharge starting voltage set for the discharging circuit is preferably such that the secondary battery still has 20 to 30% of its capacity left after discharge by its protective apparatus. For the first embodiment of FIG. 1, the lower limit of the voltage is illustratively 3.3 V per nonaqueous electrolyte secondary battery 1.

The discharging resistor is preferably selected so as to give currents at between five-hour and 30-minute discharge rates (5-hour discharge rate is a rate at which the battery capacity is exhausted in 5 hours). If the discharging resistor allows currents to flow at a rate lower than the five-hour discharge rate, the load is too light, which slows down the voltage drop in the battery and lowers the effectiveness of the protective apparatus. If, on the other hand, the discharging resistor allows currents to flow at a rate higher than the 30-minute discharge rate, the load is too heavy, which triggers an undesirable, relatively rapid temperature rise in the battery. Where a large discharge current heats up the discharging resistor considerably, the resistor is preferably equipped with suitable heat dissipating means.

The temperature sensing switching means is not limited to bimetal type switches or thermistors. The means may be implemented in the form of any other arrangement that has a temperature sensor acting at a predetermined temperature and connects and disconnects the discharging circuit to and from the battery terminals. One such alternative arrangement is a thermocouple that operates on thermoelectromotive force. Other alternatives include a shape memory alloy that changes its shape depending on temperature, and quartz oscillator whose frequency changes according to temperature. These alternatives may be used singly or in combination with suitable switching means.

The discharging circuit is not limited to those contained in the above-described embodiments. This circuit may be implemented in the form of any other circuit which allows currents to flow to the discharging resistor when a predetermined voltage setting is exceeded and which stops the currents when that voltage setting is not exceeded. One such alternative circuit is a suitable integrated circuit.

In each of the above-described embodiments, the protective apparatus is incorporated in the battery pack. Alternatively, the protective apparatus may be housed in advance within the enclosure of equipment that will later employ secondary batteries.

We claim as our invention:

1. A protective apparatus for a secondary battery, said apparatus comprising:
   a temperature sensing means for allowing current flow when the ambient temperature around said secondary battery exceeds a temperature setting; and
   a discharging circuit electrically connected via said temperature sensing means to said secondary battery, said discharging circuit discharging said secondary battery;
   said discharging circuit further comprising:
   a voltage sensing switching means being switched on substantially when the voltage applied to said discharging circuit exceeds a predetermined discharge starting voltage; and
   a discharging resistor serially connected to said voltage sensing switching means, said discharging resistor setting the discharge current in effect at the time of discharging.

2. A protective apparatus for a secondary battery according to claim 1, wherein said temperature sensing means is a bimetal switch.

3. A protective apparatus for a secondary battery according to claim 1, wherein said voltage sensing switching means at least comprises a voltage regulation diode.

4. A protective apparatus for a secondary battery according to claim 1, wherein said secondary battery is a nonaqueous electrolyte secondary battery.

5. A protective apparatus for a secondary battery according to claim 1, wherein said apparatus is incorporated in a battery pack.

6. A protective apparatus for a secondary battery according to claim 1, wherein said temperature sensing means is a thermistor.

* * * * *